UNITED STATES PATENT OFFICE.

JOHN ADAMS HATFIELD AND CHARLES ROBERT YATES, OF NEWPORT, ENGLAND.

PROCESS FOR PRODUCING CLEAN OR DEOXIDIZED METAL SURFACES.

1,080,059. Specification of Letters Patent. Patented Dec. 2, 1913.

No Drawing. Application filed December 10, 1912. Serial No. 735,959.

*To all whom it may concern:*

Be it known that we, JOHN ADAMS HATFIELD and CHARLES ROBERT YATES, subjects of the King of Great Britain, and residing, respectively, at "King's Vale", Caerleon, and 12 Bassaleg road, both of Newport, Monmouthshire, England, have invented an Improved Process for Producing Clean or Deoxidized Metal Surfaces, of which the following is a specification.

This invention has for its object an improved process for producing clean metal surfaces.

According to this invention an article of metal whose surface it is desired to clean is while in a highly heated state acted upon by silica (under which term it is intended to include a silicate) which under such conditions combines with or removes any superficial coating of oxid from such surface, the article is then in most cases allowed to cool and the coating so produced removed.

In order to prepare iron or steel plates for tinning or galvanizing they are for example evenly coated by the aid of rubber covered rolls with a solution of water glass whose strength may conveniently vary between 75° and 175° Twaddell. The plates in their wet or dried state are heated in an inclosed chamber to an annealing temperature, for example, between 700° C. and 850° C. The coating which will have been thus formed is removed from the cold plates by any suitable mechanical means, for example, by elongating the surface of the plates, or by mangling or flattening, thus allowing the silicate to break away leaving a surface in a condition suitable to be tinned or galvanized. If this mechanical treatment has not removed all traces of the silicate, the plates may be immersed in hydrofluoric acid. Or a sand blast could be employed.

The temperatures above given are by way of example only as these differ according to the material under treatment and the requirements of the finished article.

In place of employing a solution the surface to be treated may be sprinkled with a powder consisting for example of silica, or a silicate of an alkali or other metal, or a silica slag containing a high percentage of silica and heated to the required temperature, say 700° C., or the article may be dipped into a molten bath of a suitable silicate, the coating being removed when the article is cool.

In some cases when coating with a metal the article after dipping into a molten bath of silicate is passed directly from such bath into the coating metal or alloy which first acts on the silicate to remove it.

When the article to be treated is of copper, it may after treatment with a molten silica slag be quenched with water and finally any adhering silicate removed.

What we claim is:—

1. The process herein described, which consists in acting upon a metal surface while in a highly heated state with silica to clean said surface and to form thereon a removable protective coating and in cooling said coated metal and preserving said coating until the metal is further treated.

2. The process herein described, which consists in acting upon a metallic surface while in a highly heated state with silica to clean the said surface and to form thereon a removable protective coating and then coating the same with a metal to remove said protective coating and uniting the cleaned surface with said coating metal.

JOHN ADAMS HATFIELD.
CHARLES ROBERT YATES.

Witnesses:
HIGHTFOOT FOLKS,
F. CHAS. BLAND.